Patented Aug. 30, 1949

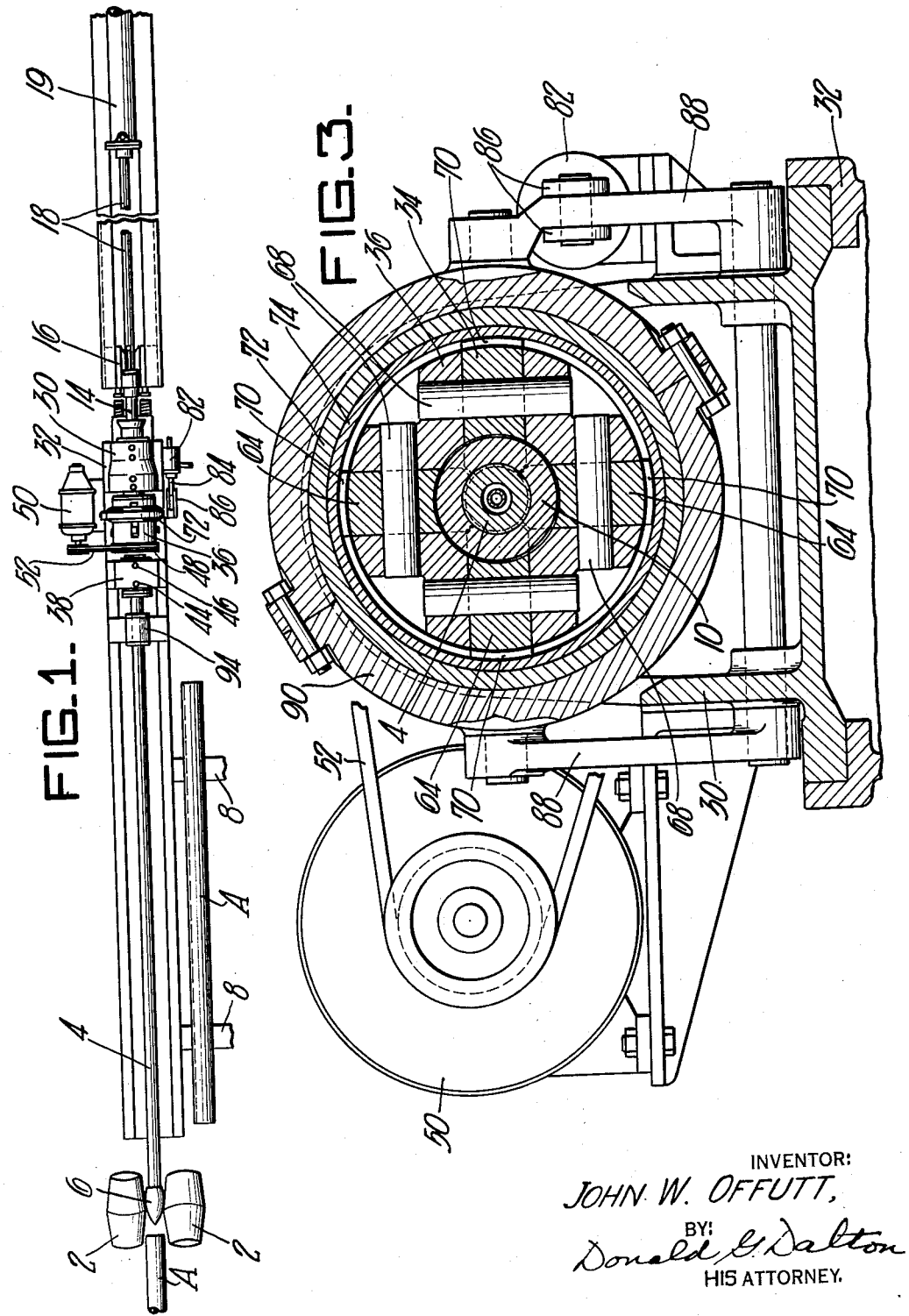

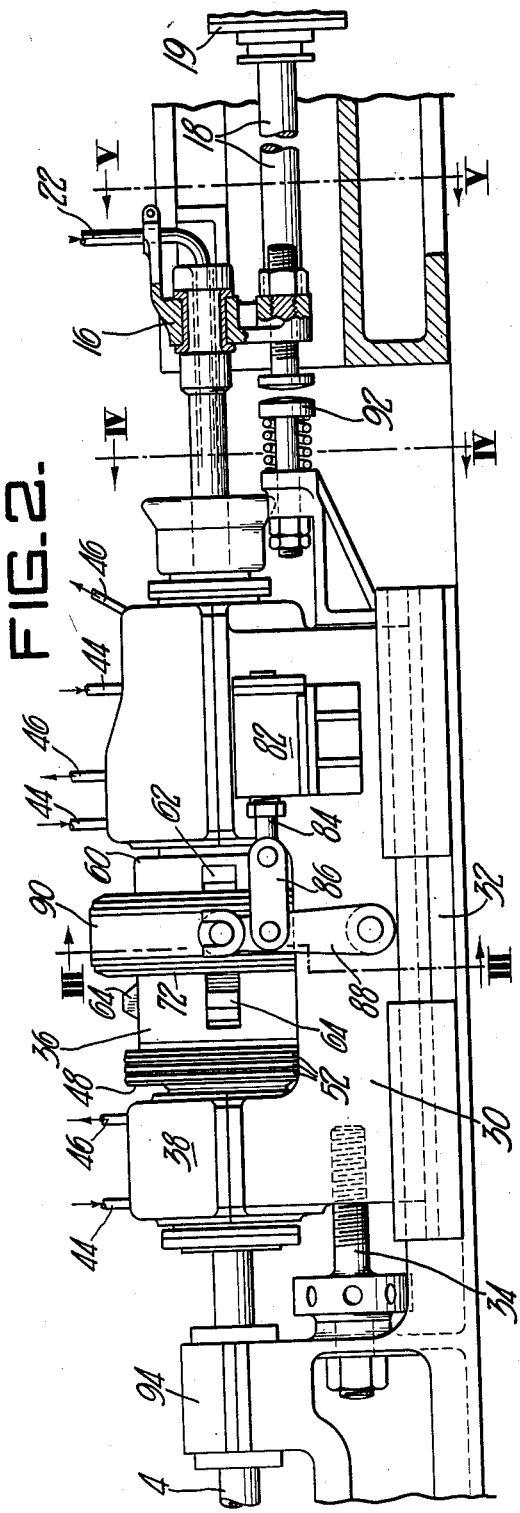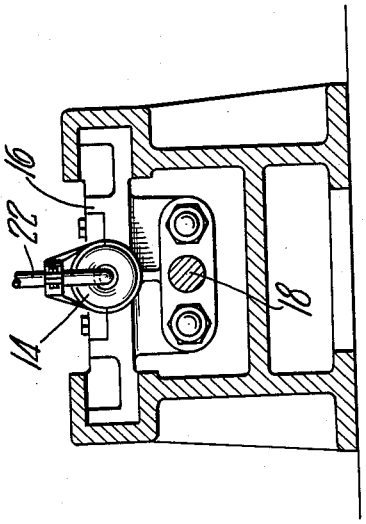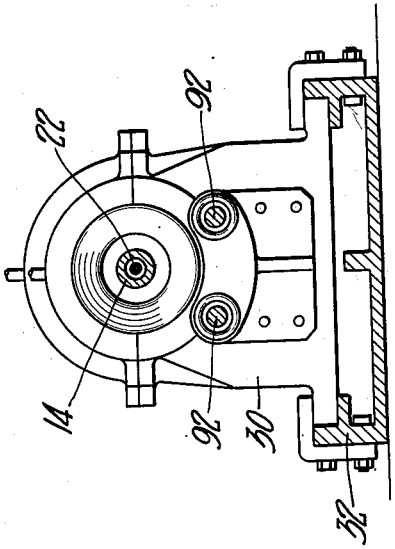
INVENTOR:
JOHN W. OFFUTT,
BY: Donald G. Dalton
HIS ATTORNEY.

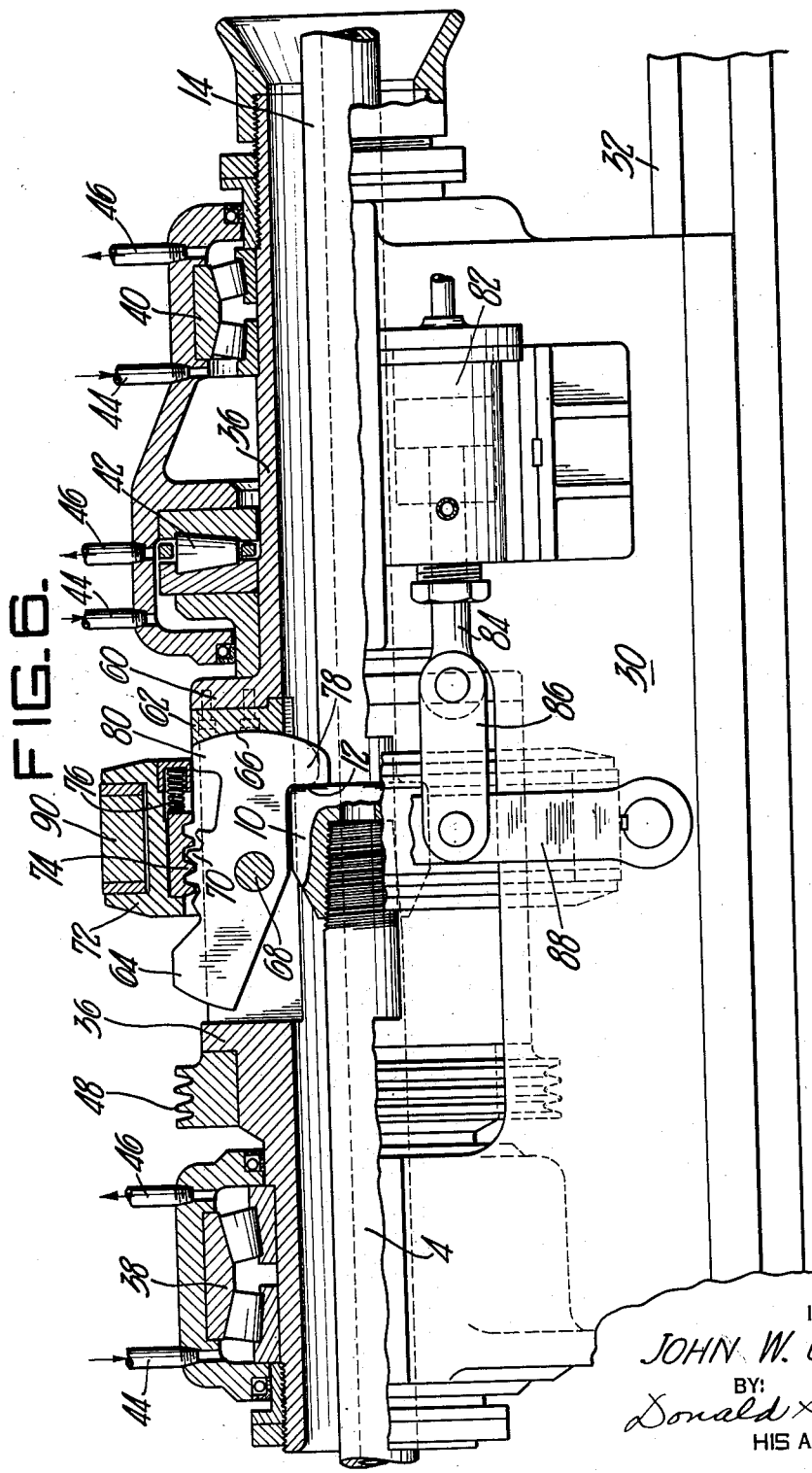

2,480,381

UNITED STATES PATENT OFFICE 2,480,381

THRUST BEARING FOR SEAMLESS TUBE
MILLS AND THE LIKE

John W. Offutt, Ellwood City, Pa., assignor to
National Tube Company, a corporation of New
Jersey Application December 20, 1945, Serial No. 636,125

5 Claims. (Cl. 80—13)

This invention relates to seamless pipe or tube mills employing a rotatable and reciprocable mandrel bar and more particularly to the thrust bearings used therein.

In rolling seamless pipe or tubing in conventional mills, a mandrel plug is held between the metal-working rolls by a mandrel bar. The mandrel plug and bar are rotated by the workpiece as it is helically advanced by the rolls over the mandrel plug and bar. Since the workpiece is telescoped over the mandrel bar during the rolling operation, it is necessary to retract or withdraw the mandrel bar from the metal-working position in order to remove the workpiece therefrom. The rearward end of the mandrel bar is secured to a thrust bearing which permits free rotation of the mandrel bar while holding it against endwise thrust or movement. In conventional mills, the thrust bearing is mounted in a block that is slidable on ways forming part of the outlet bed of the mill whereby the mandrel bar is retracted and repositioned by reciprocating the thrust bearing and block in such slideways by means of an air cylinder or a motor-actuated cable running over a drum and idler.

Such an arrangement has a number of disadvantages which result in excessive maintenance and operating expense. Thrust bearings which are large enough for large mandrels are too heavy for smaller mandrels whereby the inertia and friction effect prevent free rotation thereof. Moreover the large bearings require large mountings resulting in large and heavy housings having a substantial inertia effect thereby requiring considerable power to reciprocate the mandrel bar carriage and housing at sufficient speed to obtain fast operation of the mill. Due to the bearing and housing traveling with the carriage, it is not practical to provide circulating lubrication. Splash lubrication calls for constant oil levels in the bearing compartment and due to the restricted volume of lubricant, no means of carrying away heat or filtering of the lubricant is possible. This means that bearing failures are too frequent due to improper lubrication. Moreover in conventional designs, the point of attachment of the piercer bar to the thrust bearing spindle is outside of the bearing thereby placing the spindle under cantilever stresses due to the unbalance of the rotating bar. This condition causes excessive radial load on the bearing next to the bar. This in turn necessitates larger bearings and housings, thereby increasing the inertia effect before mentioned. The result of this is that on mills processing a large range of workpiece diameters, a thrust bearing that is large enough to stand up when making the larger sizes is so large that the resistance to turning is so great that the small bar used on the smaller sizes, will not turn freely, thereby causing the piercer point to turn on the bar cap, with excessive wear on both.

It is accordingly an object of this invention to overcome the foregoing disadvantages by providing a non-traveling thrust bearing and block for seamless tube mandrel bars.

It is a further object of this invention to overcome limitations on bearings sizes by rotating the thrust bearing spindle at the speed imparted to the mandrel plug during the metal-working operation.

It is another object of the present invention to provide a thrust bearing and housing which permits continuous lubrication of the bearing parts.

It is a still further object of the present invention to provide a thrust bearing and housing that is simple and rugged in design and durable in operation.

The foregoing and further objects will be apparent from the specification and drawings, wherein:

Figure 1 is a plan view of a seamless tube mill showing the mandrel bar and thrust bearing;

Figure 2 is a side elevation of my improved thrust bearing arrangement;

Figure 3 is a section on line III—III of Figure 2;

Figure 4 is an end view on line IV—IV of Figure 2;

Figure 5 is an end view on line V—V of Figure 2; and

Figure 6 is a longitudinal section.

Referring more particularly to the drawings, the numeral 2 designates a pair of metal-working rolls between which a mandrel plug 6 is held in metal-working position by a mandrel bar 4. After a tubular workpiece A has been completely rolled between the metal-working rolls and over the intermediately disposed mandrel plug 6, and has been telescoped thereby over the mandrel bar 4, it is removed from the mill by withdrawing the mandrel bar and moving it to an adjacent skidway 8 by conventional kick-off arms (not shown).

The mandrel bar 4 is securely connected to an enlarged head portion 10, having a shoulder 12 of a tubular extension bar 14. The rearward end of the extension bar 14 is attached to a traveling crosshead 16, which is actuated by the piston 18 of a suitable air cylinder 19 for reciprocating the mandrel bar to remove a workpiece therefrom and reposition it in its metal-working position after the workpiece has been discharged from the outlet trough. Cooling fluid may be provided for the mandrel plug 6 through bar 4 and extension bar 14 by a flexible hose 22 attached to the rear end of the extension connected to a source of fluid under suitable pressure.

A split housing 30 surrounds the bar 4 and extension bar 14 on both sides of the head 10 and is slidably mounted in a base plate 32 and can be adjusted longitudinally thereof by a screw 34. A rotatable spindle 36 is mounted within the housing 30 by means of forward radial bearing 38 and rearward radial bearing 40, and is held against axial thrust rearwardly of the housing by an intermediate thrust bearing 42. Suitable lubricant may be supplied to the bearings by inlet pipes 44 and withdrawn through pipes 46. The pipes 44 and 46 are connected to conventional lubricant filtering and circulating apparatus whereby a constant supply of lubricant is maintained in the bearings. The spindle 36 has a pulley 48 keyed thereto so that it may be driven at any speed desired by a variable speed motor 50 through V-belts 52. To insure that the mandrel bar is driven at the same speed as it is being rotated, a plus and minus reading ammeter may be included in the motor circuit to show whether the motor is being driven by the bar or the motor is driving the bar so that the motor can be adjusted to the correct speed.

An annular shoulder 60 surrounds the rotatable spindle 36 forwardly of the thrust bearing 42 and is provided with concave wear-receiving inserts 62. Four T-shaped fingers 64 having convex heads 66 are pivotally mounted in the spindle 36 midway of their length on pins 68, so that the heads 66 engage insert 62. A gear segment 70 is provided on the outer side of the fingers 64 on arcs with the pins 68 as their centers. A slidable sleeve 72 surrounds the spindle 36 around the fingers 64 and has an annular rack 74 therein which engages the gear segments 70. The rack 74 is normally spring-biased by springs 76 to a forward position but permits a limited movement of the rack relative to the sleeve. Thus rearward movement of the sleeve pivotally moves the fingers 64 so that the inner end or lug 78 is disposed in the path of the mandrel bar 4 so as to engage the shoulder 12 thereof. Also the sleeve slides over the outer lugs 80 to lock the fingers in this position. The fit of the fingers 64 on pins 68 is loose enough that none of the axial thrust set up on the bar during rolling is absorbed by the pins 68 but rather by the comparatively large surfaces of the wearing insert 62. The upper lugs 80 of the fingers are flush with the outer surfaces of shoulder 60 and insert 62 so that the sleeve can slide thereover to lock the fingers in position for holding the mandrel bar against axial thrust.

An air cylinder 82 is mounted adjacent the ring 72, the piston 84 of which is connected to the ring 72 by link 86, arms 88 and yoke 90 mounted therearound.

Due to the rack 74 being slidably mounted in the ring 72 when air is admitted to the cylinder 82 to release the bar, the yoke 90 and ring 72 will move axially far enough to uncover the upper lugs 80 of the fingers 64 by compressing the springs 76. After the ring 72 has moved far enough to uncover the lugs 80, the fingers 64 will pivot about pins 68 until the lower lugs 78 have moved outwardly to clear the head 10. The bar can then be retracted by operation of cylinder and piston 18. Forward movement of the bar is controlled on the return stroke of piston 18 by spring-mounted stops 92.

Accurate adjustment of the plug 6 relative to the rolls 2 is obtained by the screw 34. A stationary guide or bearing 94 may be provided in front of the rotary spindle to act as a guide when the bar is reciprocated.

Since it is undesirable at times to have the bar and plug rotating when there is no workpiece between the rolls, the fingers 64 are so arranged that they do not clamp the head 10 but the only contact therebetween is between the shoulder 12 and lugs 78. Thus until these surfaces are brought into frictional engagement by axial thrust on the bar due to a workpiece entering the gorge of the rolls, the rotation of the spindle will not be imparted to the bar. However, when a workpiece enters the gorge and is pushed against the mandrel plug, the frictional engagement between the shoulder 12 and lugs 78 will form a driving connection between the spindle and the bar whereby the latter will be driven by the variable speed motor 50.

Since the cooling water is supplied to and discharged from the bar at the rear end of the extension bar 14 at the crosshead 16, there is no problem of the water getting into the thrust bearing and displacing the lubricant as in conventional bearings.

While I have shown and described one specific embodiment of my invention, it will be understood that this embodiment is merely for the purpose of illustration and description and that various other forms may be devised within the scope of my invention, as defined in the appended claims.

I claim:

1. A thrust bearing for seamless tube mill mandrel bars comprising a longitudinally slidable housing, means for longitudinally adjusting said housing, a rotatable tubular spindle in said housing with a mandrel bar extending therethrough, a shoulder on said mandrel bar disposed interiorly of said spindle, a thrust bearing between said spindle and said housing, retractible fingers in said spindle adapted to engage said shoulder to transmit axial thrust thereon to said spindle, and means for retracting said fingers to permit said mandrel bar to be withdrawn through said spindle, said means comprising a gear segment on said fingers, a collar mounted around said fingers, an annular rack in said collar engaging said gear segments and means for reciprocating said collar.

2. A thrust bearing for seamless tube mill mandrel bars comprising a longitudinally slidable housing, means for longitudinally adjusting said housing, a rotatable tubular spindle in said housing with a mandrel bar extending therethrough, a shoulder on said mandrel bar disposed interiorly of said spindle, a thrust bearing between said spindle and said housing, a plurality of T-shaped retractible fingers pivotally mounted in said spindle, the inner lug of the head of the T-shaped members being adapted to be moved inwardly to engage the shoulder on said bar to transmit axial thrust thereon to said spindle, a gear segment on the outer side of the leg portion of said T-shaped members, a collar disposed around said fingers, an annular rack in said collar engaging the gear segments on said fingers, and means for reciprocating said collar to pivot said fingers to move said inner lug inwardly so as to be engaged by said shoulder or outwardly to permit the mandrel bar to be retracted through said housing and spindle.

3. A thrust bearing for seamless tube mill mandrel bars comprising a longitudinally slidable housing, means for longitudinally adjusting said housing, a rotatable tubular spindle in said housing with a mandrel bar extending therethrough, a shoulder on said mandrel bar disposed interiorly of said spindle, a thrust bearing between said spindle and said housing, a plurality of T-shaped retractible fingers pivotally mounted in said spindle with a lost motion mounting and with the lugs of the head portion disposed radially of the longitudinal axis of the mandrel bar, the inner lug of the head being adapted to be engaged by said shoulder when said lug is moved inwardly, the head of said T-shaped member having a convex face, a concave insert member in said spindle adjacent said convex head adapted to be engaged thereby when said inner lugs are engaged by said shoulder to transmit thrust from said mandrel bar to said thrust bearing.

4. A thrust bearing for seamless tube mill mandrel bars comprising a longitudinally slidable housing, means for longitudinally adjusting said housing, a rotatable tubular spindle in said housing with a mandrel bar extending therethrough, a shoulder on said mandrel bar disposed interiorly of said spindle, a thrust bearing between said spindle and said housing, a plurality of T-shaped retractible fingers pivotally mounted in said spindle with a lost motion mounting and with the lugs of the head portion disposed radially of the longitudinal axis of the mandrel bar, the inner lug of the head being adapted to be engaged by said shoulder when said lug is moved inwardly, said T-shaped member having a convex face on the head thereof, a concave annular insert member in said spindle adjacent said convex head adapted to be engaged thereby when said inner lugs are engaged by said shoulder to transmit thrust from said mandrel bar to said thrust bearing, a gear segment on the outer side of the leg portion of T-shaped members, a collar around said T-shaped members, an annular rack in said collar engaging the gear segments on said fingers and means for reciprocating said collar to pivot said fingers to move said inner lug inwardly so as to be engaged by said shoulder or outwardly to permit the mandrel bar to be retracted through said housing and spindle.

5. A thrust bearing for seamless tube mill mandrel bars comprising a longitudinally slidable housing, means for longitudinally adjusting said housing, a rotatable tubular spindle in said housing with a mandrel bar extending therethrough, a shoulder on said mandrel bar disposed interiorly of said spindle, a thrust bearing between said spindle and said housing, a plurality of T-shaped retractible fingers pivotally mounted in said spindle with the lugs of the head portion being disposed radially of the longitudinal axis of the mandrel bar, a gear segment on the outer side of the leg portion of said T-shaped fingers, a collar disposed around said fingers, an annular rack in said collar engaging the gear segments on said fingers, said rack being slidably mounted in said collar and being spring-biased away from the head of the T-shaped members, said collar being adapted to slide over the outer lug of said T-shaped head to lock the head in its inner position, said spring-biased mounting of the rack in said collar permitting said collar to slide off said upper lug before the engagement of the racks and gear segments begins the pivotal movement of said fingers.

JOHN W. OFFUTT.

REFERENCES CITED

The following references are of record in the file of this patent:

UNITED STATES PATENTS

| Number | Name | Date |
| --- | --- | --- |
| 1,088,650 | Brinkman | Feb. 24, 1914 |
| 1,240,513 | Thust | Sept. 18, 1917 |
| 2,024,514 | Diescher | Dec. 17, 1935 |
| 2,263,744 | Smith | Nov. 25, 1941 |